United States Patent [19]

Wendel

[11] 4,258,944
[45] Mar. 31, 1981

[54] SPLIT SLIP NUT AND SEAL ASSEMBLY FOR PLUMBING TRAP

[76] Inventor: Ion L. Wendel, 6585 Haines Rd. North, St. Petersburg, Fla. 33702

[21] Appl. No.: 959,342

[22] Filed: Nov. 9, 1978

[51] Int. Cl.³ .............................................. F16L 17/06
[52] U.S. Cl. ...................................... 285/342; 285/16; 285/298; 285/354; 285/387; 285/DIG. 11; 411/433
[58] Field of Search ............... 285/354, 387, 337, 342, 285/15, 16, 337, 298, DIG. 11; 85/33, 51; 29/401 R, 401 C, 401 D, 401 E, 401 F; 277/9, 222

[56] References Cited

U.S. PATENT DOCUMENTS

| 1,305,009 | 5/1919 | Robertson | 85/33 |
|---|---|---|---|
| 2,009,744 | 7/1935 | Pfefferle | 285/337 X |
| 2,377,581 | 6/1945 | Shaffrey | 85/33 |
| 3,124,502 | 3/1964 | Radke | 285/DIG. 11 |
| 3,181,896 | 5/1965 | Russell | 285/387 X |
| 3,540,761 | 11/1970 | Barlow | 285/354 X |
| 3,913,955 | 10/1975 | Teja | 285/337 |
| 4,030,741 | 6/1977 | Fidrych | 285/348 |

FOREIGN PATENT DOCUMENTS

| 24819 | of 1898 | United Kingdom | 285/337 |
|---|---|---|---|
| 1147375 | 4/1969 | United Kingdom | 285/337 |
| 1219043 | 1/1971 | United Kingdom | 285/337 |

*Primary Examiner*—Dave W. Arola
*Attorney, Agent, or Firm*—William E. Mouzavires

[57] ABSTRACT

For a plumbing trap, such as under a sink or other similar installations, a split slip nut and seal assembly for joining two tubular members such as pipes or tubes one within the other; wherein a split seal is inserted between the tubes laterally and then a slip nut formed in two split sections is applied on a threaded male sleeve surrounding the tubular members and the seal to compress the seal and to secure the tubular members together. The split sections of the nut are fastened together by releasable fasteners engaged on opposed lugs projecting from the split nut. When access to the trap is desired, the split slip nut and seal assembly avoids the necessity of dismantling the entire installation as is required with conventional slip nuts.

4 Claims, 7 Drawing Figures

SPLIT SLIP NUT AND SEAL ASSEMBLY FOR PLUMBING TRAP

BACKGROUND OF THE INVENTION

In a plumbing trap such as is typically located below a sink, a trap in the form of a tube having a reverse bend at its bottom, has an upper portion which receives a tube sometimes termed a "tailpiece", and a seal is provided between the trap tube and the tailpiece tube. A slip nut is employed to compress the seal and fasten the tubes together. The split nut is received about a male sleeve located on the end of the trap tube with the seal held within the male sleeve, and the slip nut has a shoulder, which upon advancing the split nut on the male sleeve, engages and compresses the seal to form a seal between the tubes while also securing the tubes against movement. Similar installations are also commonly utilized beneath toilets in the supply tube assembly.

When the trap must be removed for replacement or for access thereto or when the seal becomes worn or the slip nut damaged, it is necessary to dismantle the entire installation in order to effect replacement or repair. This is mainly due to the fact that the slip nut can only be removed from the tubes axially thereof.

OBJECTS OF THE INVENTION

It is an object of the present invention to permit repair or replacement of a plumbing trap or similar installation without requiring a full scale dismantling of the plumbing connections adjacent the trap. Included herein is the provision of a novel slip nut and seal assembly for a plumbing trap which may be removed from or installed in the trap assembly without requiring dismantling of the plumbing connections adjacent the trap.

It is a more specific object of the present invention to provide a novel split slip nut and seal assembly for securing and sealing the tubes of a plumbing trap. Included herein is the provision of such a split slip nut and seal assembly which may be applied to or removed from the tubes of a trap assembly in a lateral direction relative to the tube axis. A further object is to provide such a split nut and seal assembly that highly facilitates assembly or disassembly of the trap installation and yet, when in use, will effectively secure and seal the members of the trap.

Another object of the present invention is to provide such a split slip nut and seal assembly which may be economically manufactured or mass produced for use with conventional plumbing trap assemblies or other plumbing connections or joints.

SUMMARY OF INVENTION

In summary, the present invention utilizes a split seal such as may be formed from a suitable material such as neoprene which is laterally inserted around the inner tube of a trap assembly and then axially moved therealong into a position between the inner tube and a sleeve fixed on the outer tube which is part of the trap. A split nut is provided in two split sections so that they may be separately applied to or removed from the tubing laterally thereof after which they are secured together as a unit and then threaded about the sleeve to thus seal and secure the inner tube within the outer tube with the seal firmly compressed therebetween.

DRAWINGS

Other objects and advantages of the present invention will be seen from the following more detailed description taken in conjunction with the drawings in which.

DETAILED DESCRIPTION

Figure 1:
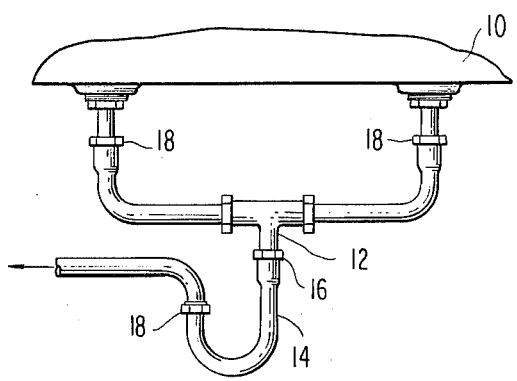
FIG. 1 is an elevational view of one typical trap assembly which may be formed under a sink and which can incorporate the split slip nut seal assembly of the present invention.

Referring now to the drawings in detail, there is shown for illustrative purposes, one type of trap assembly which exists below a sink 10, the trap assembly including a "P" trap 14 in the form of a generally J-shaped tube or pipe which receives a tailpiece which is a tube or pipe 12, and which is secured in tube 14 by means of a slip nut 16. Between tubes 12 and 14, there is a seal (not shown in FIG. 1) which is compressed between the pipes 12 and 14 in sealing engagement by means of slip nut 16 which is threaded on a sleeve fixed to the upper end of trap tube 14. Other similar couplings are shown generally at 18 in FIG. 1.

Figure 2:
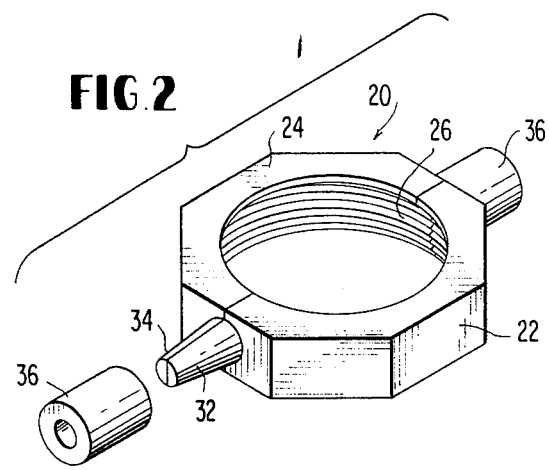
FIG. 2 is a perspective view of a split slip nut in accordance with the present invention with one of the parts thereof shown in exploded fashion to illustrate assembly.

Referring now to FIG. 2, there is shown a part of one preferred embodiment of the present invention which is a slip nut generally designated 20 for substitution for conventional slip nuts such as 16 shown in FIG. 1. Slip nut 20 of the present invention is a split nut formed in two generally semicircular sections 22 and 24, the outer peripheral surfaces thereof being provided with flat lands so that when joined as shown in FIG. 2, they define a hexagonal surface for facilitating engagement by a suitable wrench. The internal surfaces of the split nut sections 22 and 24 are provided with threads 26 so that when joined as shown in FIG. 2, they define one continuous thread for purposes of engagement on corresponding complementary threads provided on the outer surface of a male sleeve 30 shown in FIG. 5. Male sleeve 30 which need not be split, is a conventional item and has a shoulder 31 for engagement over the upper end of trap tube 14.

Returning to the description of split nut 20, its sections further include diametrically opposed projecting lugs 32 and 34 which, when the sections are joined together as shown in FIG. 2, define tapered frustoconical lugs, one being shown in FIG. 2. These lugs receive fasteners for securing the sections together as a unitary nut. In the embodiment of FIG. 2, the fasteners are sleeves 36 having internal tapered passages conforming to the taper of lugs 32, 34 so that when pressed over the latter, they will firmly hold the slip nut sections 22 and 24 together.

Figure 4:
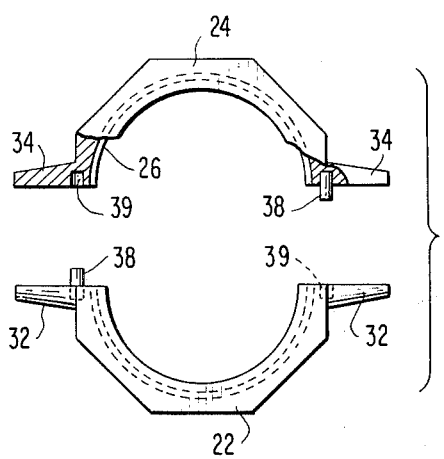
FIG. 4 is a plan view of the split nut shown in FIG. 2 but with the parts shown in a disassembled condition and with certain parts removed for clarity.

In order to locate split nut sections 22 and 24 prior to securement by means of sleeves 36, a locating pin 38 is provided on each section as best shown in FIG. 4. Each section has, at one side, a locating pin 38 and on the other side, a locating recess 39 dimensioned to receive the locating pin 38 of the other section.

Figure 3:
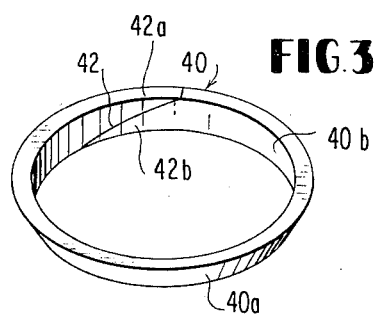
FIG. 3 is a perspective view of a split seal included in the present invention.

Referring to FIG. 3, the assembly of the present invention further includes a split seal 40 made from any suitable material such as neoprene and which is split along a 60° incline at 42, thus enabling sections of the seal 40 to be separated from each other for placement of the seal in a lateral direction around the tubular members of the trap assembly. Referring to FIG. 3, the direction of the split line 42 must be chosen in accordance with the direction of the threads 26 of the split nut sections such that the upper split portion 42a of the seal points in the advancing direction of the threads 26 such that when the split nut 20 is advanced on the male sleeve 30 to secure the seal in place, the torque pressure exerted on the upper split portion 42a of the seal will cause it to firmly be seated on the lower split portion 42b, thus ensuring complete and continuous sealing engagement along the split line 42. The specific direction of split line 42 shown in FIG. 3 corresponds to right-handed threads 26 of the split nut 20.

Figure 5:
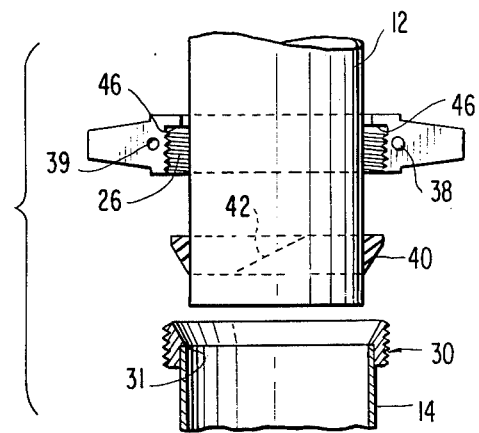
FIG. 5 is an elevational view of tubular portions of a trap including the split slip nut and seal assembly of the present invention shown in positions prior to final assembly.
Figure 6:
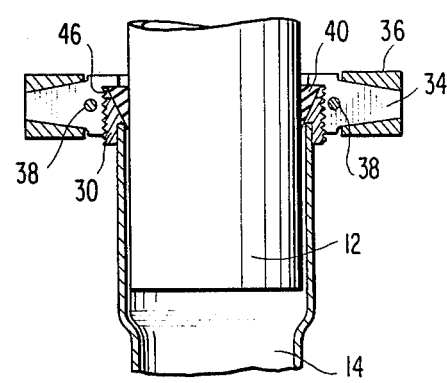
FIG. 6 is a view generally similar to FIG. 5 but showing the parts in their final assembled position.

Seal 40 is formed with an external tapered surface 40a and an internal cylindrical surface 40b. As shown in FIG. 5, during assembly, seal 40 is placed around the inner tube 12 and this may be done by laterally moving sleeve 40 around tube 12 by virtue of the separable split nature of seal 40. However, the seal being resilient will return to its closed condition as shown in FIGS. 3 and 5. When the trap assembly is finally installed as shown in FIG. 6, seal 40 is pressed between the inner surface of sleeve 30 and the outer surface of inner tube 12 by means of slip nut 20. In this latter regard, slip nut sections 22 and 24 are formed with internal recesses at one end of their threads 26, which form a shoulder 46 for engaging the upper surface of seal 40 and applying axial pressure to the seal to firmly engage the seal about the tube 12. This not only secures the tubes 12, 14 together but also, establishes a seal between the outer surface of inner tube 12 and the inner surface of outer tube 14.

In order to assemble the trap assembly in accordance with the present invention, the male sleeve 30 is fixed on the end of outer tube 14 and then seal 40 is inserted about inner tube 12 (FIG. 5) utilizing the split 42 in seal 40 in order to effect easy placement of seal 40 laterally about tube 12. Above seal 40, the split nut sections 22 and 24 are assembled about inner tube 12 by means of the locating pins 38 which are placed into their corresponding recesses 39, and then the split sections are secured together by inserting fastener sleeves 36 over the tapered lugs 32, 34. The split nut 20 may then be moved axially downwardly along inner tube 12 to engage seal 40 with the shoulder 46 and then engage threads 26 of the split nut with the threads of male sleeve 30. The split nut may then be advanced along male sleeve 30 to compress and deform the seal 40 downwardly against the sleeve 30 and laterally inwardly against the inner tube 12 to establish a secure sealing engagement between the inner tube 12 and the outer tube 14.

If for any reason it is desired to disassemble the trap assembly to permit replacement of any of the tubes 12 or 14 or to replace the seal 40 or the split nut itself, the split nut 20 may be quickly and easily disassembled by removing sleeves 36 from the lugs 32, 34 and simply laterally separating the split nut sections 22 and 24 to thereby expose the seal and disconnect the tubes. Should it be desired to repair or replace a trap or similar installation containing a conventional split nut, the latter may be loosened and moved away from the joint along the associated tube, and then the repair or replacement is made, and then the assembly is provided with a split nut assembly of the present invention. It will therefore be seen that the present invention avoids the necessity of dislocating other pipes or plumbing connections in the entire trap assembly in order to permit the split nut to be removed from the assembly as heretofore been required with conventional slip nuts.

Figure 7:
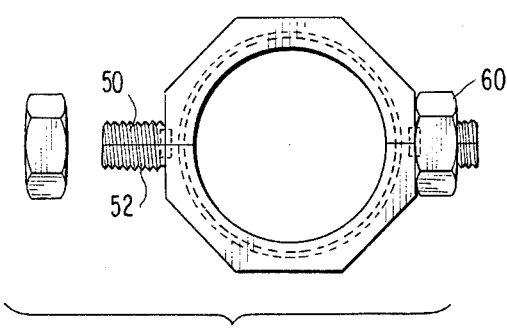
FIG. 7 is a plan view of a modification of the split nut of the present invention with one part thereof shown in disassembled condition.

Referring now to FIG. 7, a modification of the split nut of the present invention is shown which utilizes semicylindrical threaded lugs 50 and 52 instead of tapered lugs 32 and 34 of the embodiment of FIG. 2. Otherwise, the split nut sections themselves are the same. In addition, with the FIG. 7 embodiment, the split nut sections are secured together by other fasteners which use lock nuts 60 which engage over threaded lugs 50 and 52, as illustrated in FIG. 7; lugs 50, 52 when notched forming a threaded cylindrical lug or bolt. It should also be noted that the threaded lugs 50 and 52, as well as 32 and 34 in the above embodiment of FIG. 2, provide a hand grip facilitating the threading or unthreading of the slip nut during assembly or disassembly. In addition to the lock nuts 60 and threaded lugs 50 and 52 shown in FIG. 7, other means may be utilized for securing the splut nut sections together.

What is claimed is:

1. A plumbing assembly such as a trap or similar installation including a first, outer, tubular member having a longitudinal passage therein, a second, inner, tubular member having a longitudinal passage therein and adapted to be received in the longitudinal passage of the outer tubular member, a male sleeve having external threads and being engaged on an end portion of the other tubular member, an annular seal made from flexible and deformable material received between an outer surface portion of the inner tubular member and an inner surface portion of the male sleeve, a split nut including two separable split sections each having projecting from opposite portions thereof lugs with the lugs of one section registering with the lugs of another section, fastener means securing the lugs of the split sections together as a unit, said split nut sections having matching internal threads engaged on the threads of the male sleeve, said split nut sections having internal surface portions pressing said seal into engagement between the male sleeve and the inner tubular member to secure the inner and outer tubular members together and to establish a seal therebetween, said fastener means being removable from said lugs to disassemble said split nut sections laterally of the tubular members, and said seal being split to enable removal from around the inner tubular member laterally thereof, and wherein said lugs of the split nut sections define a tapered surface on the exterior thereof and wherein said fastener means includes a sleeve having a tapered internal surface corresponding to and engaging the tapered surface of the lugs.

2. A plumbing assembly such as a trap or similar installation including a first, outer, tubular member having a longitudinal passage therein, a second, inner, tubular member having a longitudinal passage therein and adapted to be received in the longitudinal passage of the outer tubular member, a male sleeve having external threads and being engaged on an end portion of the other tubular member, an annular seal made from flexible and deformable material received between an outer surface portion of the inner tubular member and an inner surface portion of the male sleeve, a split nut including two separable split sections each having projecting from opposite portions thereof lugs with the lugs of one section registering with the lugs of another section, fastener means securing the lugs of the split sections together as a unit, said split nut sections having matching internal threads engaged on the threads of the male sleeve, said split nut sections having internal surface portions pressing said seal into engagement between the make sleeve and the inner tubular member to secure the inner and outer tubular members together and to establish a seal therebetween, said fastener means being removable from said lugs to disassemble and split nut sections laterally of the tubular members, and said seal being split to enable removal from around the inner tubular member laterally thereof, and wherein said lugs have threads on the exterior thereof and wherein said fastener means are lock nuts engaged over the threads of the lugs.

3. The assembly defined in claim 1 wherein said seal is split along a split line forming upper and lower split portions above and below the split line, the upper split portion leading in a direction corresponding to the leading direction of the threads of the split nut section so that advancement of said split nut along the threads of the male sleeve will draw the split portions of the seal closer together to ensure a continuous annual seal between the outer and inner tubular members.

4. The assembly defined in claim 2 and wherein said seal is split along a split line forming upper and lower split portions above and below the split line, the upper split portion leading in a direction corresponding to the leading direction of the threads of the split nut sections so that advancement of said split nut along the threads of the male sleeve will draw the split portions of the seal closer together to ensure a continuous annular seal between the outer and inner tubular members.

* * * * *